Patented Sept. 5, 1933

1,925,921

UNITED STATES PATENT OFFICE 1,925,921

COVERING FOR FLOORS, WALLS, AND THE LIKE

Alfred Arthur Godfrey, London, England, assignor to Linoleum Manufacturing Company, Limited, London, England No Drawing. Application July 11, 1932, Serial No. 622,009, and in Great Britain April 14, 1931

2 Claims. (Cl. 154—2)

This invention relates to improvements in coverings for floors, walls and the like.

One of the main objects of the present invention is to provide an improved method of manufacturing coverings for floors, walls and the like, which method shall be simple and easy to carry into practice, which may be utilized to provide a satisfactory flexible covering material, and which shall be such as to enable a plurality of different colours and patterns to be incorporated in the finished material.

According to one feature of the present invention, a method of manufacturing a covering for floors, walls and the like comprises, assembling tesserae of non-plastic material adjacent one another in closely contiguous relation, pressing said tesserae upon raw rubber bonding material, so as to force it to flow between the edges of adjacent tesserae, and maturing by vulcanizing, whereby the edges of said tesserae are secured together by the rubber which has been forced therebetween.

The bonding material may be carried upon the backs of the individual tesserae before said tesserae are assembled, so that when pressure is applied thereto, the rubber upon the backs of each of the tesserae when assembled adjacent to one another will be forced up between the said tesserae and thus secure the adjacent edges thereof together and will also unite to form a single sheet.

The tesserae may be made of any of a variety of different non-plastic materials, for example, vulcanized rubber, cured linoleum, wood veneer, stone or earthenware.

According to a further feature of the invention a covering for floors, walls and the like is made by pressing tesserae of non-plastic material into a plastic joining or bonding material, such as raw rubber, rubber substitute, glue rendered insoluble in water, or uncured linoleum, so that the joining material is forced to flow between and substantially to fill the spaces between the edges of adjacent tesserae, vulcanizing, curing, or otherwise treating the joining material, if necessary, whereby the edges of said tesserae are secured together by the joining material which has been forced to flow therebetween the surface of the floor being substantially plane, as distinct from a floor covering in which the tesserae are only partly embedded in a backing so that the surface of the backing and the surface of the tesserae, are at different levels.

In carrying out this feature of the invention the strength of the covering does not necessarily depend upon backing material (remaining on the underside of the tesserae) which may in the finished product, be quite thin, and incapable, by itself, of securely holding the tesserae together.

In carrying out the invention the bonding material is, in general, forced to flow so as to fill so far as is practical the spaces between the tesserae but in many cases it is advisable to ensure that the bonding material shall not overflow on to the upper surface of the covering and form a thin film on a part of said upper surface, in which case it not infrequently occurs that the backing material does not entirely fill the space between the tesserae.

In carrying out the invention as applied to the manufacture of a covering in which the tesserae are of veneer of wood, a sheet of veneer is first of all firmly pressed on to a thin sheet of raw rubber in a cold press, that face of the rubber sheet on to which the veneer is placed being preferably first rubbed with naphtha. The sheet of veneer with its rubber backing is then cut up to form tesserae. This can readily be effected by means of dies, since the rubber backing prevents splintering of the wood. The tesserae are now assembled to form a pattern and are pressed and vulcanized in a vulcanizing press. During the process the rubber is forced up between the edges of the tesserae thus firmly uniting the edges. In order to impart a polish to the surface of the material, this may be coated with a solution of wax or other suitable material before it is treated in the vulcanizing process.

In a modification, instead of placing a sheet of veneer on a sheet of rubber we may employ plastic material such as a synthetic rubber, or rubber substitute, or a glue rendered insoluble in water, of uncured linoleum as the backing material.

Again in a modification, instead of applying the wood veneer to a rolled sheet of rubber in a cold press, in order to "surface" it, a rubber solution may be applied to the wood veneer or a rubber solution may be applied to paper or like material to which the wood veneer is then pressed, being afterwards cut up to form tesserae, assembled to form a pattern and pressed and vulcanized in a vulcanizing press.

The assembled sheet of patterned material thus formed is preferably afterwards mounted on canvas, felt base or like material, and obviously any floor or wall covering material in accordance with this invention may be provided with a canvas, felt or other base if desired.

When manufacturing a floor covering which necessitates vulcanization, and is of such length that it exceeds the length of the vulcanizing press, means are preferably provided for vulcanizing the covering by steps and for clamping the leading portion of the part to be next vulcanized.

What I claim is:—

1. In the manufacture of a patterned covering in sheet form for floors, walls, and the like, the method of securing together the edges of tesserae which form the pattern, comprising assembling tesserae of non-plastic material adjacent one another in closely contiguous relation on bonding material such as plastic raw rubber; pressing said tesserae against the bonding material so as to force said material to flow from under the tesserae up between the edges of adjacent tesserae and to fill the spaces between the tesserae, thereby providing a covering having a substantially plane surface; and maturing the said material, whereby the edges of said tesserae are secured together by the material which has been forced to flow therebetween.

2. In the manufacture of a patterned covering in sheet form for floors, walls, and the like, the method of securing together the edges of tesserae which form the pattern, comprising assembling tesserae of non-plastic material adjacent one another in closely contiguous relation on bonding material such as plastic raw rubber, the volume of bonding material provided being equal to the aggregate volume of the spaces between the tesserae plus only enough surplus to insure filling said spaces; pressing said tesserae against the bonding material so as to force said material to flow from under the tesserae up between the edges of adjacent tesserae and to fill the spaces between the tesserae, thereby providing a covering having a substantially plane surface; and maturing the said material, whereby the edges of said tesserae are secured together by the material which has been forced to flow therebetween.

ALFRED ARTHUR GODFREY.